United States Patent [19]

Sullivan

[11] Patent Number: 4,682,088
[45] Date of Patent: Jul. 21, 1987

[54] POWER MEMORY SEAT AND MIRROR CONTROL SYSTEM

[75] Inventor: Thomas M. Sullivan, Grosse Pointe Woods, Mich.

[73] Assignee: Chrysler Motors Corporation, Highland Park, Mich.

[21] Appl. No.: 849,984

[22] Filed: Apr. 10, 1986

[51] Int. Cl.⁴ .............................................. G05B 19/29
[52] U.S. Cl. .................................... 318/568; 318/603; 318/466
[58] Field of Search ......................... 318/568, 603, 466

[56] References Cited

U.S. PATENT DOCUMENTS

| | | | |
|---|---|---|---|
| 4,264,849 | 4/1981 | Fleischer et al. | 318/603 X |
| 4,267,494 | 5/1981 | Matsuoka et al. | 318/568 |
| 4,510,426 | 4/1985 | Michaels et al. | 318/565 |
| 4,523,136 | 6/1985 | Dudeck et al. | 318/568 |

OTHER PUBLICATIONS

National Semiconductor Corp. brochure "Power Seat with Memory" Richard Kovener.
Electronics Week Magazine "Automotive Multiplexers Turn to Fiber" Wesley R. Iverson, Nov. 5, 1984, pp. 36, 37.

Primary Examiner—William M. Shoop, Jr.
Assistant Examiner—Saul M. Bergmann
Attorney, Agent, or Firm—Wendell K. Fredericks

[57] ABSTRACT

A power memory seat and mirror apparatus useful for controlling manual and automatic operations is disclosed. Supply voltage switch signals and analog voltage potentiometer sense signals are buffered so as to provide digital logic signals utilized by a microcomputer to store in a non-volatile memory desired seat and mirror position data. Means are provided permitting later recalling of the desired position data and automatically repositioning the seat and mirrors to the memorized positions. The system also provides diagnostic and failure mode operations. Additional means is included for activating the system when the ignition switch of the vehicle is off.

5 Claims, 4 Drawing Figures

POWER MEMORY SEAT AND MIRROR CONTROL SYSTEM

BACKGROUND OF THE INVENTION

The present invention relates generally to novel control systems employing programmable memory position control techniques and particularly to power seat and mirror position adjustment memory systems.

DESCRIPTION OF THE PRIOR ART

In prior art power drive seat and external door mirror memory systems, it is well known to feature powered adjustment of the driver seat and external mirrors to driver chosen positions, to provide the ability to store at least two sets of position information in memory and to instantly recall and automatically adjust the seat and mirrors to either of the at least two sets of stored information. Various controller networks, position sensor arrangements and mechanical motion strategies and combinations thereof have been employed to develop efficient and safe automatic power seat and mirror systems for the automotive industry.

With ignition switch OFF, to retain nonvolatile data in memory, several effective storing schemes have been employed. These schemes have been employed as a convenience to enable the automatic seat adjusting equipment to store seat data while reducing the electrical load on the vehicle battery especially when the engine is not running and charging the battery.

One scheme is described in a four-page National Semiconductor Corporation brochure on page 3 entitled "Power Seat with Memory" by Richard W. Kovener. There, in order to minimize battery drain, Vcc (5 VDC power) is turned off to all circuitry associated with automatic seat control except for the static RAM. Power to the RAM at all times insures that nonvolatile data about seat location is preserved. But, such arrangement does cause some battery drain, the system does not go into a "sleep" mode, a mode that doesn't draw battery current.

Another arrangement for retaining a non-volatile data in memory while minimizing battery current drain is described in U.S. Pat. No. 4,510,426 issued Apr. 5, 1985 to Michaels et al. There, a voltage signal referred to as VSTB (Voltage Standby) power signal is continuously applied to memory. Also to insure that seat position data is not lost even when d.c. system power is interrupted such as when the automobile battery is removed from the vehicle, the electronic controller is provided with capacitors which have sufficient capacity to supply power to memory for up to twenty-four hours. Such schemes do effectively retain nonvolatile seat data in memory but, again, there is some battery current drain when the ignition switch is OFF and there is only a limited period of time the voltage storing capacitors mentioned supra can supply power to memory.

A means for the validation of stored seat values in memory is described in U.S. Pat. No. 4,523,136 dated June 11, 1985 of Dudeck et al. There, if values stored in memory are lost after an interruption of the supply voltage, no automatic adjustments can take place. During the first seat data storing routine after such an interruption, a code word defined in ROM is transmitted into memory and compared with the content of memory and a seat adjustment is initiated as a safety measure only when the two words correspond. This approach does not insure nonvolatile seat position data.

Also, in the prior art, immediately after ignition is turned on, various safety measures have been used to protect the vehicle as well as the driver from automatic operation of the seat adjustment equipment. One safety measure is described in the Michaels et al patent mentioned previously. There, a pair of switches are used to disable the system from automatically adjusting the position of the driver seat when the transmission of the automobile is in a drive or reverse state. The input for the switch is derived from a conventional sensor in the automatic transmission. Inhibiting the automatic seat adjustment equipment in this manner appears to be suitable for vehicles with automatic transmissions but may not be suitable for manual transmission vehicles.

In the prior art various seat failure monitoring schemes have been employed. One such scheme is described in the previously mentioned Dudeck et al patent. There, after energization of a seat motor control relay, if within a predetermined time interval, the actual value of the adjusting motor position coordinated to the relay and detected by the respective sensing method does not change, the power to the relay is interrupted. This scheme appears to be a conventional failure monitoring circuit of the type used with stepping motors. The reaction period of this type scheme between actuation and detection is not usually specifically defined. Thus, excessive wear of the rack mechanism used to adjust the seat and damage to the adjusting motors that drives the rack mechanism usually is difficult to control.

Another approach defined in the previously mentioned Michaels et al patent provides pulse position signals generated concomitantly with actuation of the adjusting motors. These pulse position signals are sent to the microcomputer and counted to determine the present position of the vehicle seat. The time interval between these pulses is monitored and a stall condition (a condition occurring when the rack mechanism actuated by the seat adjusting motors encounters a physical stop) is determined when the interval exceeds a predetermined period. Because stalls at the mechanical stops are not prevented, wear to the rack mechanism and the motors usually results. Although counting commutator generated pulses provides suitable monitoring of seat locations, it is an indirect measuring approach. Also, such a system adds to the generation of undesirable radiated and conducted signals at or near frequencies of interest for radios and other vehicular electronic devices.

To reduce the large numbers of wires between romotely located switches, sensors and the control electronics, prior art systems have employed software controlled multiplex networks. Such a system is described in the aforementioned National Semiconductor Corporation brochure on page 4. There, instead of digital sensors being used to monitor seat movement, analog sensors connected to analog to digital converters (ADC's) are used to convert position information to a binary format. The multiplexer under software control selects which sensor to measure. It is not necessary in this approach to keep a constant account of the seat's position since it can be determined by polling the potentiometer sensors. However, such a system, by necessity, has need to both multiplex and demultiplex each bit of the digital codes derived from the ADC's. Such serial data transfers often generate unwanted radiated and conducted signals at or near frequencies of radios and other electronic devices. Although multiplexing systems tend to reduce congested wiring sites in the doors especially of high end cars (such cars usually feature window lifts, mirror adjustments, seat adjustments and central door locking) because of these extra functional components, the chance of catastrophic failure is increased which could completely inhibit any automatic seat adjusting until the system is repaired.

Still another approach has been proposed to minimize the number of wires and wire bundle size associated with a hard wired system. This system described in the article entitled "Multiplexers Turn to Fiber", by Esley R. Iversen, appearing at page 36–37 of the Nov. 5, 1984 issue of Electronic Week magazine, employs a passive fiber optic system. The system requires nothing more than a specially-designed ribbon cable that carries two 1-mm diameter optical fibers (one each for transmitting and receiving) and two electrical power wires. Terminals are interconnected through a passive star coupler which is a 30-mm long, 3-mm diameter optical fiber rod. The input and output fibers are clustered at opposite ends of the rod. An input signal presented at one end is distributed over the rod's area as it passes down the rod's length so that it is equally divided among all of the output fibers. System software features include redundancy so that if one station stops transmitting, controls associated with the other two stations will continue to function. Although the system does appear to perform satisfactorily, further study of such a scheme is required before it can be considered a proven system.

BRIEF SUMMARY OF THE INVENTION

The present invention relates to an apparatus for controlling movement of an adjustable seat in a vehicle in conjunction with controlling movement of an adjustable driver door rearview mirror and an adjustable passenger door rearview mirror. Manual switches are used to adjust the seat and mirrors to desired positions and to generate switch voltage signals. Linear potentiometers coupled to motive means adapted for moving the seat and mirrors are used to generate analog signals indicative of seat and mirror movements. Buffer means in a control module are used to receive the switch signal voltage signals and potentiometer analog signals, convert the switch signals to logic levels and the analog signals to digital number value words and to store these signals in respective registers.

A microcomputer which views the storing buffers as memory slots utilizes the buffers to obtain desired seat and mirror adjustment data that can be retained in a non-volatile memory for at least two different drivers of the vehicle and then later used on command of the driver to automatically actuate the motive power means to drive the seat and mirrors to the memorized locations. The buffer data can also be utilized by the microcomputer to execute diagnostics and failure mode operations. Means are also provided for awaking the microcomputer from a zero current draw condition.

BRIEF DESCRIPTION OF THE DRAWING

Referring to the drawing figures in which like numerals represent like parts in the several views.

DETAILED DESCRIPTION OF A PREFERRED EMBODIMENT

Figure 1:
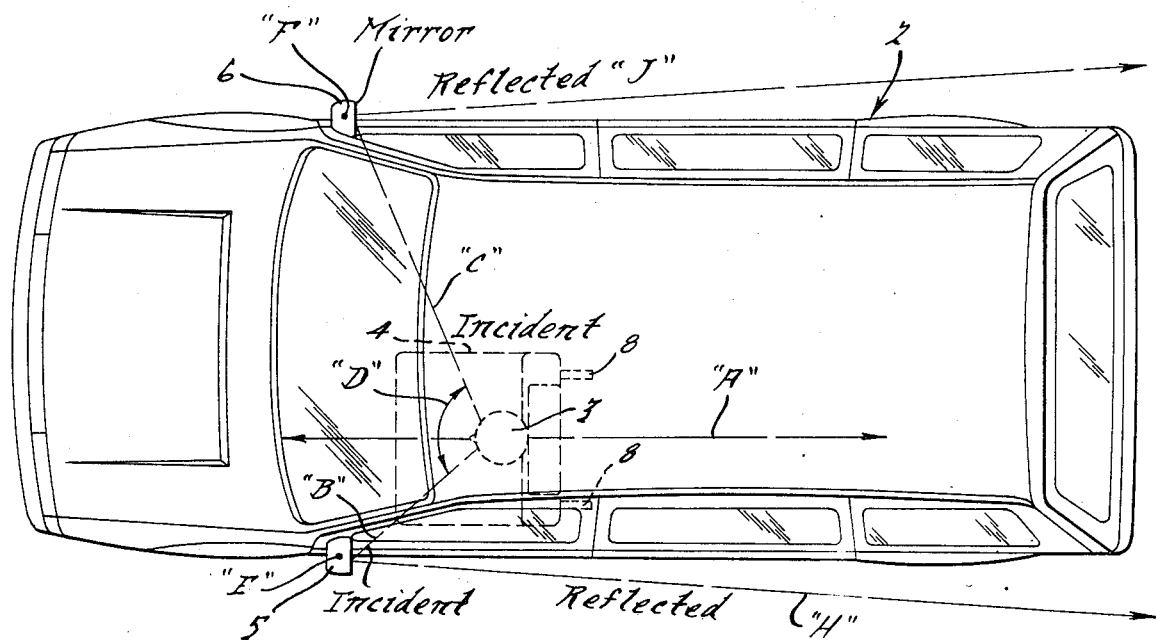
FIG. 1 is a top view of a driver in a vehicle illustrating the lines of view to and from rear view mirrors mounted on the vehicle doors.
Figure 2:
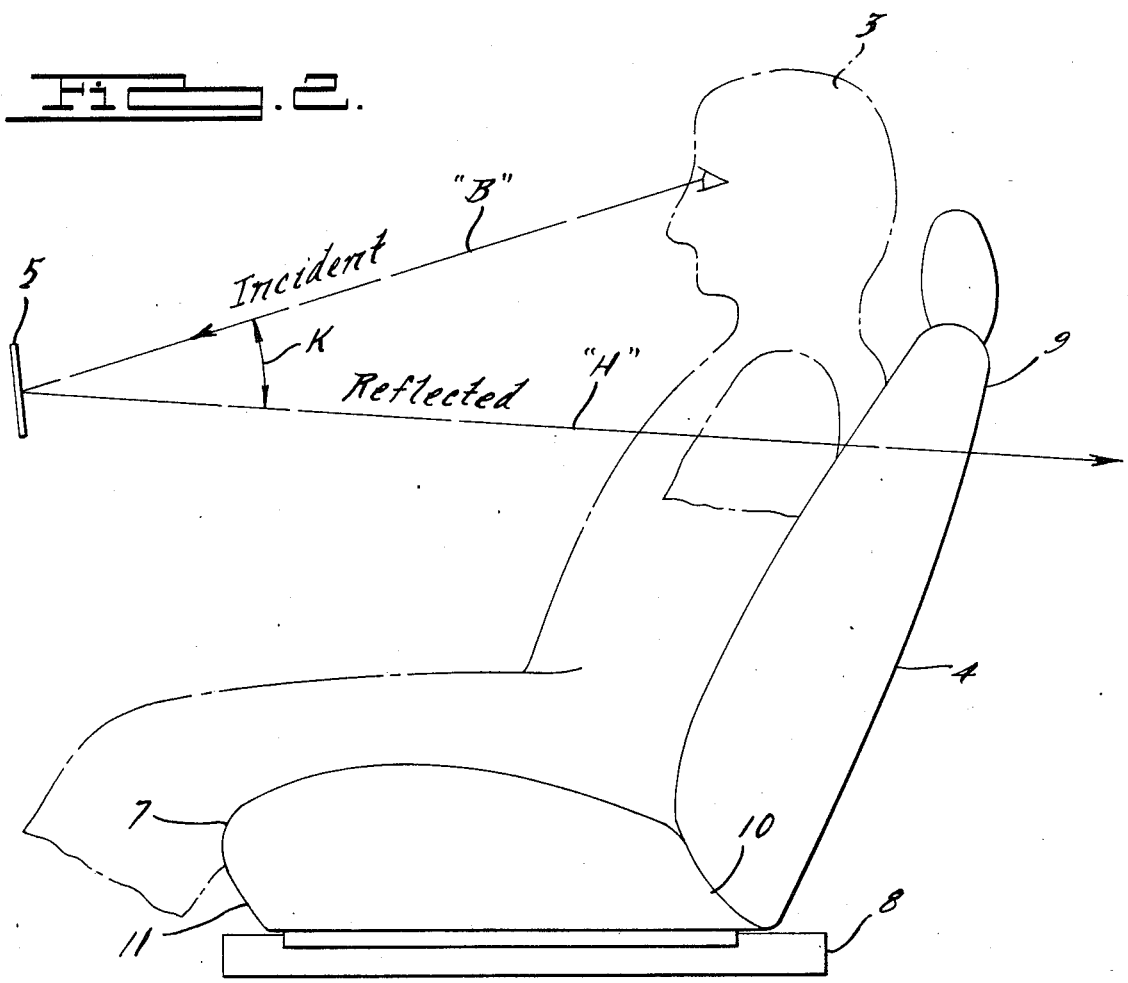
FIG. 2 is a side view of the driver sitting in an adjustable seat in line of sight of a rear view door mirror.

With reference now to drawing FIGS. 1 and 2, there is shown in FIG. 1 a top view of a vehicle 2 with a driver 3 sitting in an adjustable driver seat 4 viewing driver door external mirror 5 and passenger door external mirror 6 (the structure of the doors not being specifically delineated). FIG. 2 illustrates a side view of driver 3 sitting in seat 4 viewing mirror 5. It is apparent from these figures that if seat 4 is adjusted, the external mirrors should be adjusted.

In FIG. 1, with respect to longitudinal axis "A", a first incident path of view "B" to driver door mirror 5 is less than a second incident path of view "C" to passenger door mirror 6. An included angle "D" increases as the driver 3 moves seat 4 closer to the mirrors and it decreases as seat 4 is moved away from the mirrors. As included angle "D" varies, the angular positions of mirrors 5 and 6 about first and second vertical axes "E" and "F", respectively, must also vary to correct for changes occurring to first and second reflected paths "H" and "J" of the view.

Adjustable driver seat 4 includes a seat cushion 7 slideably mounted on a pair of transport tracks 8—8 as shown in FIG. 1 and a seat back pivotally mounted about a rear end 10 of seat cushion 7 for tilting movement between an upright position and a rearward reclined position.

Mounted in tracks 8—8 are rack mechanisms (not shown) that are linked to cushion 7 and seat back 9 for affecting at least eight different directions of seat movement. A front end 11 of seat cushion 7 and the rear end 10 can be moved attitudinally up and down independently or simultaneously. Seat cushion 7 can be moved positionally along tracks 8—8 to a plurality of locations from between a full forward position, which enables a reasonably short statured driver to reach the floor controls of the vehicle, and a full rearward position which permits easy entry into and out of the vehicle.

Mounted in track 8—8 are end stops (not shown) disposed to limit forward and rearward motion of cushion 7. Illustratively, for this type of seat, displacement along tracks 8—8 is generally about 7.5 inches, maximum elevation attitude of cushion 7 above tracks 8—8 is about 1.5 inches and the amount of angular adjustable tilt of the seat back 9 is about 38 degrees.

As can be realized from FIG. 2, as seat back 9 is tilted forwardly or rearwardly, the included angle "K" between the incident path of view "B" of driver mirror 5 and the reflected path of view "H" remains the same but the incident and reflected paths of view will tend to rotate about horizontal axis "M" causing the reflected path of view "H" to point in a direction illustratively away from along the side of the vehicle. Similarly, if cushion 7 is elevated or lowered, the vertical angle of the door mirrors must be adjusted to correct the paths of view. Keepers (not shown) are disposed on a drive shaft protruding from the driver door and the passenger door and are used to limit mirror angular displacement, illustratively to about ±10 degrees about either axis.

Figure 3:
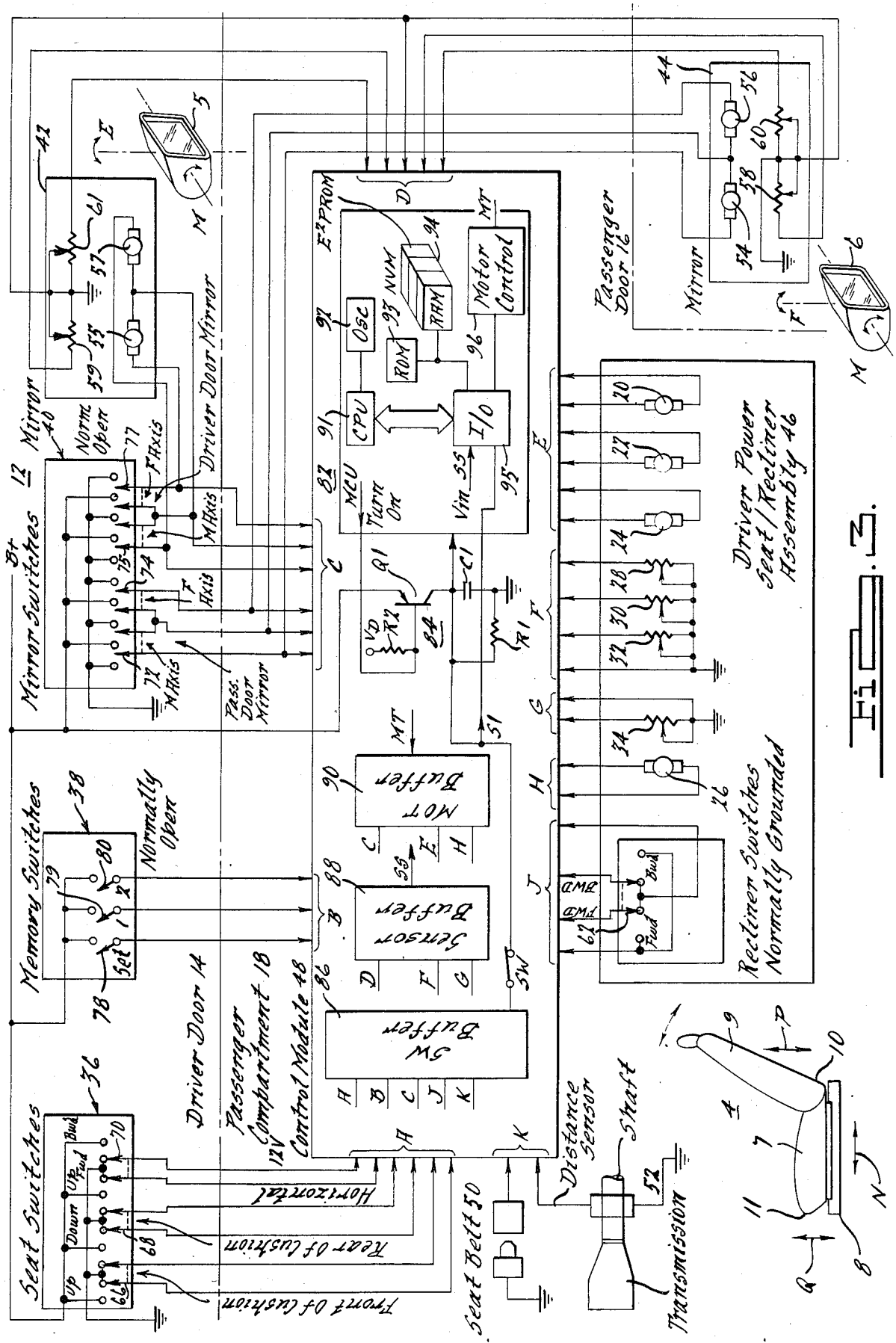
FIG. 3 is a partially block, partially schematic diagram of a power memory seat and mirror control system.

With reference to FIG. 3, there is shown a preferred embodiment of a power memory seat and mirror control system 12 for manually and automatically adjusting the seat and external mirrors. System 12 includes both seat and mirror control components in driver door 14, mirror components in passenger door 16 and passenger compartment 18. Driver door 14 contains seat switch group 36, memory switch group 38, mirror switch group 40, and driver door mirror assembly 42. Passenger door 16 only includes passenger door mirror assembly 44. Passenger compartment 18 includes driver power seat/recliner assembly 46, control module 48, seat 4, seat belt 50 and distance sensor 52.

Mirror assembly 44 is used to control passenger door mirror 6. Mirror assembly 44 comprises a first conventional reversible d-c motor 54 connected to mechanical linkage (not shown) for rotating mirror 6 about horizontal axis M, a second reversible d-c motor 56, similarly linked, for rotating mirror 6 about second vertical axis "F", a first conventional linear potentiometer 58 connected to sense movement of mirror 6 about horizontal axis M and a second linear potentiometer 60 similarly connected to sense movement of mirror 6 about vertical axis "F". The motors are actuated by switches in driver door 14 and power to the potentiometer is supplied from control module 48. Keepers (not shown) disposed on a drive shaft of the mechanical linkage for rotating the mirrors are used to limit mirror angular displacement, illustratively to about ±10 degrees about either axis.

Mirror assembly 42 comprises identical components for driver door mirror 5. First and second reversible d-c motors 55 and 57 and first and second linear potentiometers 59 and 61 drive and sense movement of mirror 5 about horizontal axis M and first vertical axis "E", respectively. Likewise, the mirror motors are controlled by switches in door 14 and potentiometers receive power from control module 48.

Driver power seat/recliner assembly 46, comprised of switches, potentiometers and motors, controls seat movement. A rack mechanism (not shown) couples track motor 20 to seat 4 for propelling seat 4 back and forth along track 8. Rear motor 22 and front motor 24, similarly coupled are used to unilaterally or jointly elevate or lower respective ends of seat cushion 7. Recliner motor 26, similarly coupled, drives seat back 9 of seat 4 from an upright position through a plurality of recline positions. Front end of cushion potentiometer 32, rear end of cushion potentiometer 30, track movement potentiometer 28, coupled to the rack assembly, provide linear voltage signals to control module 48 proportional to seat position changes. Actuation of cushion motors are controlled by switches in door 14. Actuation of seat back motors are controlled by a recliner switch 62. This switch is considered part of seat switch group 36 although located in the passenger compartment away from the other switches on door 14.

Three switch groups; namely, seat switch group 36, memory switch group 38, and mirror switch group 40 are used to manually control the seat and mirror motors in a non-memory mode. Seat switch group 36 comprises normally grounded switches with the open terminal tied to B+ or battery power. These switches as shown in FIG. 3, are front of cushion switch 66 for up and down actuations; rear of cushion switch 68 for up and down actuations; horizontal movement along track switch 70 located in the driver door 14; and seat back forward and backward recliner switch 62 located in the passenger compartment 18.

Mirror switch group 40, used to manually control the mirror motors for external mirrors 5 and 6 is comprised of four (4) normally open switches. Each switch is capable of applying either analog ground or B+ to the motors. Switches 72 and 74 are used to manually operate passenger door mirror 6 and switch 75 and 77 are used to manually operate driver door mirror 5.

Memory switch group 38 is comprised of normally open switches 78, 79 and 80 designated SET, "1" and "2", respectively. These switches when activated are used to send B+ level voltage signals to the control module for storing in memory the seat and mirror positions for driver No. 1 and a second driver No. 2 when either switch SET and switch "1" or switch SET and switch "2" are successively activated. The actuations of switch 1 or 2 are used to recall a memorized seat and mirror position.

Another group of switches consisting of a seat belt switch 50 and a distance sensor switch 52 provide input to control module 48. Seat belt switch 50 provides a ground signal to control module 48 inhibiting it if seat belt 50 is connected. Distance sensor switch 52 provides pulses to control module 48 when vehicle 2 is in motion. These pulses inhibit operation of control module 48 preventing automatic memory seat movements from occurring.

Control module 48 controls automatic operation of the seats and mirrors. Module 48 comprises a microcomputer MCU 82; an ignition off zero current draw, voltage latch circuit 84; a switch buffer module 86 which interfaces with all of the aforementioned switches from the various switch groups; a sensor buffer module 88 which interfaces with all of the aforementioned potentiometers; and a motor buffer module 90 which interfaces with all motors.

Figure 4:
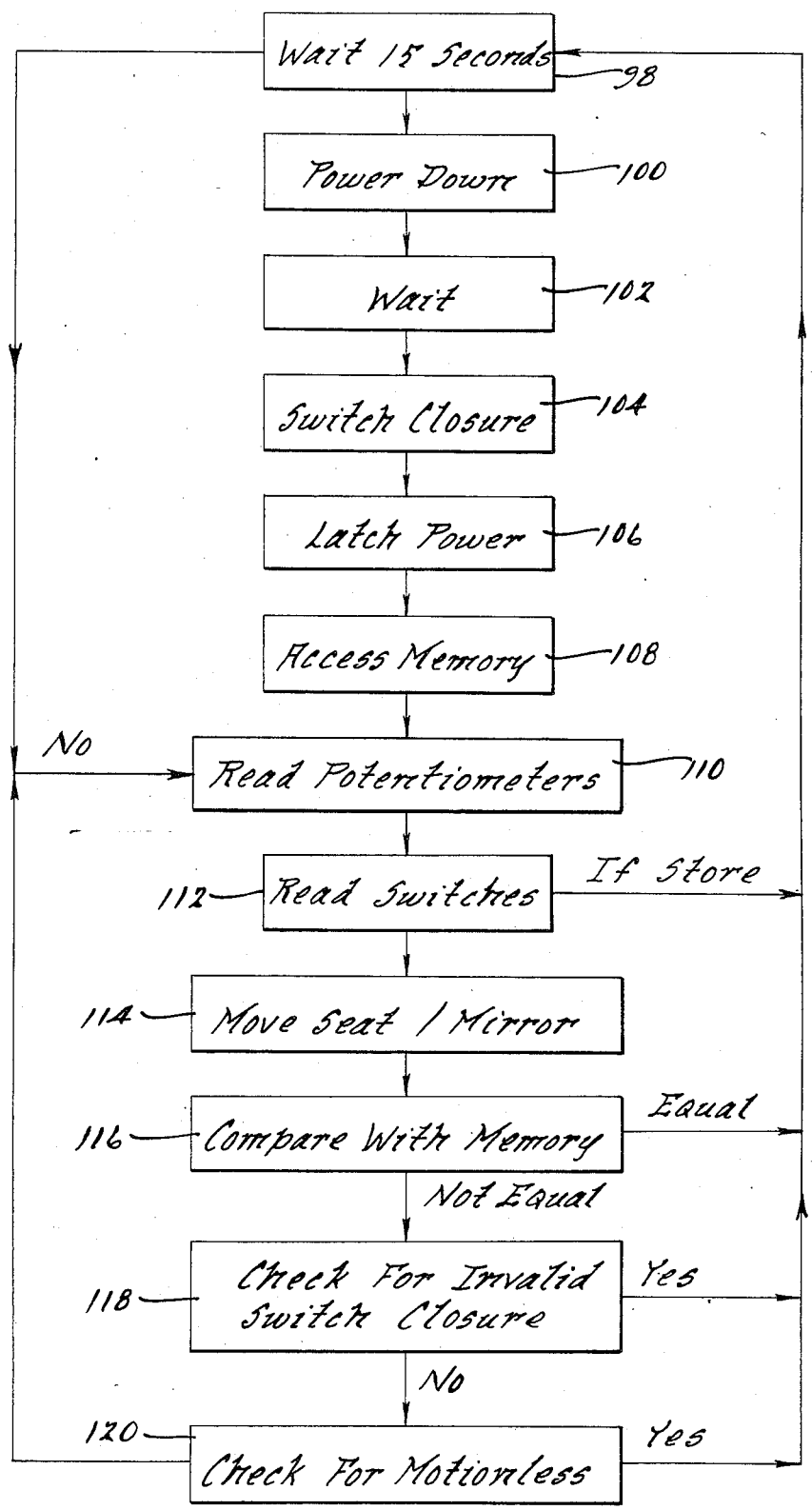
FIG. 4 is a flowchart illustrative of the operation of the power memory seat and mirror control system.

MCU 82 comprised generally of a conventional CPU 91, oscillator 92, a ROM 93, a NVM 94, input/output (I/O) device 95 and a motor control module 96 is used to perform logic and analog functions for controlling the seat and mirrors. Oscillator 92 is used to generate a frequency-stable clock signal for timing synchronous operations and simple sequences. CPU 91 performs arithmetic operations, controls instruction processing, and provides timing signals. ROM 93 stores firmware representative of the flow chart of FIG. 4 shown infra. NVM 94 is used to store both independent and nonvolatile data during the various modes of non memory and memory operations. Input/Output device (I/O) 95 is hardware by which data enters into the MCU or which data are recorded for immediate or future use. Motor control module 96 converts 5 volt seat and mirror signal data to 12 volt motor control voltages for driving the seat and mirror motors.

The ignition off-zero draw current draw, voltage latch circuit 84 is used to permit awakening the MCU while the ignition switch is off and when control module 48 is drawing zero current from the B+ voltage battery. Capacitor $C_1$ charges when any switch input from a switch group is actuated, providing a suitable voltage level to the microcomputer 82 which in turn outputs a suitable voltage signal for turning on transistor $Q_1$ of circuit 84 causing B+ to be used to generate a voltage $V_{in}$ which powers microcomputer 82.

Switch buffer module 86 contains conventional circuits for converting 12 V switch signals into 5 V switch signals compatible with signal levels used by MCU 82. The buffer also provides means for the computer to detect the status of each switch signal being generated during actuation. The buffer looks just like a memory slot at a selected memory location. Each switch input controls the status of a single bit in the memory slot at a selected memory location. The switch inputs are gated into the buffer under the control of the CPU 91. MCU 82 can detect the state of the digital inputs by examining the bits in the buffer anytime after the inputs are gated into the buffer.

The input lines to module 86 from the three cushion switches are designated "A", the inputs from the seat back switch is labeled "J" the inputs from the memory switches are designated "B" the inputs from the mirror switches are labeled C; seat belt and distance sensor switch inputs are labeled "K" and "R", respectively.

Switch buffer 86 signals are also routed to the voltage latch circuit for awakening the MCU during zero current draw mode, and are also routed to the I/O of MCU 82 for outputting signals to motor control module 96 during manual mode operations to permit the manual switches to be used to control seat and mirror measurements.

Sensor buffer module 88 converts the analog potentiometer signals from all the aforementioned potentiometers into digital number words that the MCU 82 can read. The potentiometer inputs into sensor buffer modules are designated "D" representing mirror potentiometers, "F" representing the seat cushion potentiometers and "G" representing seat back potentiometer. The potentiometers of this system are chosen at a specific resistance, illustratively 1K ohms at one end of travel and 100 ohms at the other end of travel, so as to provide analog signals directly proportional to the physical movement of the seat components and mirrors.

The location of the end stops on the pair of tracks, the keepers associated with mirrors and the end stops for the seat back are all memorized and stored permanently in NVM and all utilized during polling of the switch and sensor modules in a manner which prevents seat and mirror structure from abutting the stops, causing wear and tear.

The motor buffer module 90 is essentially an interface module interfacing the motor input lines to the motor control module 96 in the MCU. The motor control module connects seat motor to 12 V power by means of relays and mirror motors by means of electronic relay circuits.

The wiring arrangement between switch groups and the control module are such that a minimum number of wires are used, reducing the congestion of wire sites in the vehicle doors. Using potentiometers without multiplexing circuits, reduces the occurrence of radiated and conducted signals at or near frequencies of radios and other electronic devices.

Operation of power memory seat and mirror system 12 will now be explained with reference to the diagram of FIG. 3 and the flowchart of FIG. 4.

Assume vehicle 2 is parked and the ignition switch is turned off. Driver 1 enters the vehicle with the idea of adjusting seat 4 to his comfort. As depicted in block 100 of FIG. 4, the power to system 12 is down and as in block 102, the system 12 is waiting for a switch to be closed.

Driver 1, without fastening his seat belt and turning on the ignition, closes one of the seat switches illustratively, the front-up switch 66 of seat switch group 36. Any switch closure, as block 104 of the flowchart relates, causes B+ voltage to be routed to switch buffer module 86 and the voltage latch circuit 84. The voltage is applied across capacitor C1 and resistor R1. Capacitor C1 charges while the switch is closed and the discharges when the switch is released, the switches being momentary action type switches. Voltage, either from the switch closure or from the discharging capacitor C1, provides sufficient power for MCU 82 to begin a power-up routine. As part of the power-up routine, MCU 82 applies a voltage to the base of transistor $Q_1$ to latch power, as in block 106 of the flowchart, to control module 48.

MCU 82 now completes a "boot strap" program stored in ROM 93 which transfers any seat and mirror position data stored in NVM into RAM of memory 94 as block 108 of the flowchart indicates. The boot strap program sets all CPU registers with correct values and clears to zero all independent data in RAM before any further program loading is performed.

The program, as in block 110 and 112, reads the potentiometers and switches. Generally, there are three (3) possible acts that can be initiated by the switch closure: Firstly, if a seat switch (66, 68 or 70), a recliner switch 62 or a mirror switch (72, 74, 75 or 77) is closed, then MCU 82 applies power to the associated motor to cause the seat or mirror to move as indicated in block 114 of the flowchart. Movement occurs for as long as the switch remains closed. Secondly, if the set switch 78 is closed followed by the closing of either switch 1 or switch 2, that, i.e., is switch 79 or 80, respectively, a switch data storage situation occurs. These two sequential switch closures comprise a store. The present values of resistance of the potentiometers (28, 30, 32, 34, 58, 59, 60 and 61) as found in the sensor buffer 88 are converted to digital values and placed in the RAM portion of memory 94 where they remain until a later transfer into the NVM portion of memory 94 is executed.

Thirdly, if memory switch 1 or 2, i.e., switch 79 or 80, respectively, of memory switch group 38 is closed without the set switch being used, then MCU 82 applies power to the associated motors as necessary to cause the seat, recliner and mirror positions to equal the values stored in the NVM of memory 94 for the memory switch that was closed. MCU 82 is now in a loop that continually reads the potentiometers, reads the switches, compares the potentiometer values being read against the stored potentiometer values in memory as in block 116 of the flowchart and then checks for valid switch closures. A switch closure during a memory recall operation is assumed to be a panic reaction by the driver in response to an incorrect position selection which causes the program to abort the memory recall operation as a safety feature as depicted by the decision block 118 of the flowchart. The loop is continued until all the potentiometer values are equal. This implies that all motors are turned off and the system is motionless as indicated in block 120.

If a switch in any group is actuated for more than 15 seconds, all the switches in that group will be ignored until the fault is corrected. Generally, the switch that is stuck in an abnormal position is sensed by the driver and moved to a position which alleviates the stuck switch problem. The other two groups of switches are unaffected by the stuck switch correction procedure.

The system now waits for fifteen (15) consecutive seconds to elapse without the occurrence of a switch closure as shown in block 98. If a switch closure occurs, the program loops to block 110 and 112 where the switch closure causes one of the three possible acts mentioned supra to be initiated. If fifteen seconds elapse without a switch closure, the system powers down as shown in block 100. The voltage is removed from the base of transistor $Q_1$ interrupting power causing system 12 to enter the wait state shown in block 102.

It is understood that the above-described embodiments are mainly illustrative of the principles of the invention. One skilled in the art may make changes and modifications to the embodiments without departing from the scope and the essential characteristics therefore.

What is claimed is:

1. A power memory seat and mirror control system for controlling movement of an adjustable seat in a vehicle in conjunction with controlling movement of an adjustable driver door rearview mirror and an adjustable passenger door rearview mirror, said seat being the type having a first motive power means adapted to slideably move a seat cushion of said seat along a pair of transport tracks between front rear end stops of said pair of tracks, a second motive power means adapted to move attitudinally a front end and a back end of said seat cushion to a plurality of chosen height positions above said pair of tracks, and a third motive power means adapted to tilt a seat back of said seat from a chosen upright position through a plurality of recline positions; said driver door mirror and said passenger door mirror being the type having a fourth motive power means adapted for angular rotation of said driver door mirror about a first vertical driveshaft protruding from a driver door, a fifth motive power means adapted for angular rotation of said driver door mirror about a horizontal axis of a first horizontal drive shaft protruding from said driver door, a sixth motive power means adapted for angular rotation of said passenger door mirror about a second vertical drive shaft protruding from a passenger door and a seventh motive power means adapted for angular rotation of said passenger door mirror about said horizontal axis of a second horizontal drive shaft protruding from said passenger door, said first and second vertical and horizontal drive shafts, respectively, having keepers for limiting rotations of said driver door mirror and said passenger door mirror to within chosen limitations, the system comprising:

(a) switch means, coupled to each of said first through seventh motive power means being manually actuatable for generating supply voltage level signals for driving each of said first through seventh motive power means when adjusting said seat cushion and said seat back, said driver door mirror and said passenger door mirror to desired locations;

(b) potentiometer means cooperating with each of said first through seventh motive power means for providing analog voltage indicative of the amount of horizontal and attitudinal movement of said seat cushion, the amount of tilt of said seat back and the amount of angular rotation of said driver door mirror and said passenger door mirror from an initial position to a final position in response to manual actuations of said switch means;

(c) a first buffer means in a control module cooperating with said switch means for receiving said generated supply voltage level signals from said switch means, converting said supply voltage level signals to independent switch logic level signals, and storing said independent switch logic level signals in respective registers;

(d) a second buffer means in said control module cooperating with said potentiometer means for receiving said analog voltages from said potentiometer means, converting said analog voltages into independent equivalent digital number words, and storing said independent equivalent digital number words in respective registers;

(e) microcomputer means in said control module interconnecting said first buffer means, and said second buffer means for performing logic and analog functions for controlling said system, said microcomputer means comprising a motor control means for driving said motive power means of said seat, of said driver door mirror, and of said passenger door mirror in response to control signals from control circuits within said microcomputer means; memory means including a static random access memory means for temporarily storing said independent switch logic level signals and said independent equivalent digital number words, and a non-volatile storage memory means for long duration storing of said independent switch logic level signals and said independent equivalent digital number words; said microcomputer means providing control signals to said motor control means during an automatic mode of operation of said system, and said microcomputer means providing means for determining end stop locations so that movement of said seat and said driver door and passenger door mirrors is so controlled so as to prevent said seat and said mirrors from abutting said end stops, whereby wear and tear of said end stops are prevented; said motor control means in said microcomputer means being interconnected to a motor buffer means within said control module for interfacing said motor control means to said first through seventh motor power means.

(f) memory switch means coupled to said first buffer means comprised of at least one set switch and a first driver store switch and a second driver store switch, said set switch being actuated with either said first driver store switch or said second driver store switch to transfer said stored independent switch logic level signals and said stored independent equivalent digital number words into said non-volatile storage memory means converting said independent signals and words into non-volatile data used by said microcomputer for providing control signals to said motor control means during an automatic mode of operation of said system.

2. Apparatus in accordance with claim 1 wherein said control module includes an ignition off zero current draw voltage latch means for activating said system in response to actuations of said switch means while an ignition switch of said vehicle is in an OFF position.

3. Apparatus in accordance with claim 1 wherein said system also includes means for inhibiting operation of said system when said vehicle is in motion thus preventing automatic memory seat movements from occurring.

4. Apparatus in accordance with claim 3 wherein said inhibiting means includes a seat belt switch which, when closed, provides a ground voltage signal to said control module which is used to inhibit said system, said inhibiting means also includes a distance sensor switch which provides digital pulses to said control module which also inhibits said system.

5. Apparatus in accordance with claim 1 wherein said control module includes means for turning power off to said first through seventh motive power means in response to non-movement of said seat or said door mirrors when said independent switch logic level signals are generated.

* * * * *